United States Patent

[11] 3,626,089

[72] Inventors Gildo Cecchin
Niles;
Francis H. Hilbert, River Grove, both of Ill.
[21] Appl. No. 880,059
[22] Filed Nov. 26, 1969
[45] Patented Dec. 7, 1971
[73] Assignee Motorola, Inc.
Franklin Park, Ill.

[54] CHROMA SIGNAL PROCESSING CIRCUIT FOR A COLOR TELEVISION RECEIVER
13 Claims, 1 Drawing Fig.

[52] U.S. Cl. .......... 178/5.4 AC
[51] Int. Cl. .......... H04n 9/48
[50] Field of Search .......... 178/5.4 AC, 5.4 ML, 5.4 HE, 5.4 CK, 5.4 SD, 7.3, 69.5 CB

[56] References Cited

UNITED STATES PATENTS

| | | | |
|---|---|---|---|
| 3,141,064 | 8/1970 | Macovski .......... | 178/5.4 AC |
| 3,444,477 | 5/1969 | Avins .......... | 178/73 E |
| 3,506,776 | 4/1970 | Rennick .......... | 178/5.4 SD |

*Primary Examiner*—Robert L. Griffin
*Assistant Examiner*—Richard P. Lange
*Attorney*—Mueller, Aichele & Rauner

ABSTRACT: A color television receiver has an integrated circuit chroma amplifier and burst-separating circuit using a pair of differential current-steering gates as the output and separating stage thereof with switching of the steering gates being utilized to gate the chroma signals to a chroma output during the scan portions of the cycle of operation of the receiver, and to gate the burst signals to an output coupled to a reference oscillator, with a substitution of a corresponding DC operating level being provided at each of these outputs when the signal is being switched to the other output. In addition, the chroma amplifier DC operating point is determined by a constant current source which is immune to variations in the DC level of the signals caused by variations in the ACC gain control signal.

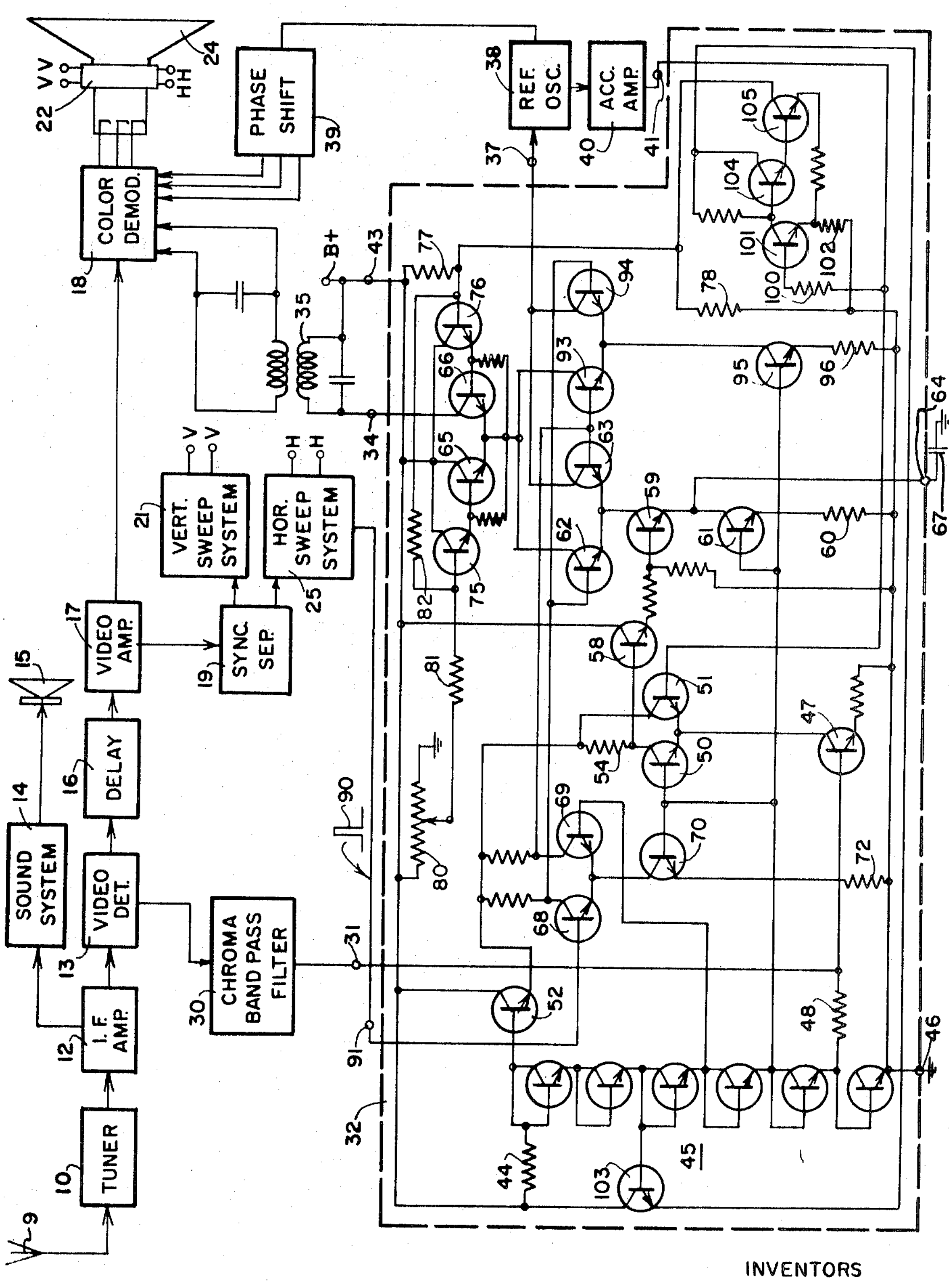
INVENTORS
GILDO CECCHIN
FRANCIS H. HILBERT
BY
Mueller, Aichele & Rauner
ATTYS.

CHROMA SIGNAL PROCESSING CIRCUIT FOR A COLOR TELEVISION RECEIVER

BACKGROUND OF THE INVENTION

The standard NTSC color television signal is comprised of a color information signal component, phase and amplitude modulated on a color subcarrier to represent hue and saturation, respectively; a brightness component; a burst signal component synchronized with the color information subcarrier; and synchronizing signal components.

In the color television receiver, separate channels to the demodulator are provided for the brightness and color components. The burst signal is separated from the remainder of the composite signal to provide a reference signal used for controlling the synchronous demodulation of the modulated color component. Since the saturation of the colors in the image reproduced by the receiver is dependent upon the ratio of the amplitudes of the color subcarrier waves and the brightness signal components, it has been found desirable to utilize a separate or selective gain control of the color processing channel, in addition to any automatic gain control apparatus similar to that which is employed in a conventional black and white television receiver.

Since the amplitude of the burst component bears a direct relationship with the amplitude of the color information component of the composite signal, a selective automatic gain control for the chrominance or color channel often is derived from the amplitude of the burst component. This selective gain control function for the color or chroma processing channel is designated as the "automatic chroma control" (ACC) function.

With the use of integrated circuits for the color processing portions of a television receiver, it is desirable to use differential amplifier configurations using direct DC coupled circuitry. With such circuitry the utilization of an ACC-DC control voltage for varying or controlling the gain of the color or chrominance amplifier channel can cause variations in the DC signal level through this channel due to the fact that the DC level is variable with the ACC input to a differential control or steering amplifier.

It also is desirable to provide a gating or switching of the color subcarrier components and burst components in such an integrated circuit color processing portion of a television receiver, with the circuit operating in a transientless manner to gate the burst components to the color oscillator reference portion of the receiver and to gate the modulated color subcarrier to the demodulation section of the receiver.

SUMMARY OF THE INVENTION

Accordingly it is an object of this invention to provide an improved color processing circuit for a color television receiver.

It is an additional object of this invention to provide an operating point immune amplifier for the color processing portion of a television receiver.

It is another object of this invention to provide an improved chroma/burst gate for the color processing portion of a television receiver.

It is yet another object of this invention to employ differential amplifier circuit configurations for ACC control of the chroma signal level and for a chroma/burst gating circuit to enable the utilization of integrated circuit techniques in the fabrication of the color processing circuit of a color television receiver.

In accordance with a preferred embodiment of this invention, the color processing circuit of a television receiver includes first and second differential current steering gates each having two outputs and operating as the chroma/burst gate, with the input signals being applied to one of the differential steering gates and a DC signal level being applied as the input to the other of the differential steering gates. The DC signal levels applied to both differential steering gates are substantially the same. One of the outputs of each of the differential steering gates is connected with a corresponding output of the other steering gate, forming two composite outputs from the pairs of steering gates. The conductivity of the amplifier elements in each of the differential steering gates is controlled to determine to which of the outputs the signal is supplied and to which of the outputs the DC level only supplied.

In addition, a differential current modulator is provided with a DC gain control signal for varying the gain of the composite signal applied to the input of the differential current modulator. This output signal of the differential current modulator then is applied to an output amplifier, having a DC operating point which is independent of the DC operating level of the output signals obtained from the differential current modulator, to produce the input signals applied to the one of the differential steering gates.

BRIEF DESCRIPTION OF THE DRAWING

The single FIGURE of the drawing is a schematic diagram, partially in block form, of a color television receiver employing a color processing circuit in accordance with a preferred embodiment of the invention.

DETAILED DESCRIPTION

Referring now to the drawing, there is shown a color television receiver including an antenna 9, supplying input signals to a tuner 10 which receives and converts the incoming television signals to an intermediate frequency signal. The tuner 10 may include, for example, RF stages of the receiver, as well as the first detector or mixer and an associated local oscillator. The output intermediate frequency developed by the tuner 10 is coupled through an intermediate frequency amplifier stage 12 to a video detector 13. The output of the intermediate frequency amplifier 12 also is supplied to a sound system 14 which supplies the amplified audio signals to a loud speaker 15. Brightness signal components in the detected composite video signal are delayed in a delay circuit 16, for purposes well known to those skilled in the art, and are applied to a video amplifier 17, the output of which is supplied to a color demodulator circuit 18, The composite signal provided by the video amplifier 17 has video information components, with a blanking interval recurring at the horizontal rate of 15,734 Hz. A horizontal synchronizing pulse appears at the beginning of each blanking interval, immediately followed by a burst signal component. A vertical synchronizing pulse also appears in the composite video signal at a 60 Hz. rate and is separated from the remainder of the composite signal in a synchronizing pulse separator circuit 19. The separated vertical synchronizing pulses then are applied to a vertical sweep system 21 which develops a vertical sawtooth sweep signal V—V in vertical deflection windings placed on a deflection yoke 22 on the neck of the cathode-ray tube 24 for vertically deflecting the electron beams in the cathode-ray tube 24.

The horizontal synchronizing pulse also is separated from the remainder of the composite signal in the pulse separator circuit 19 and is applied to a horizontal sweep system 25, which develops horizontal sweep signals H—H in horizontal deflection windings on the deflection yoke 22 for horizontally deflecting electron beams in the cathode-ray tube.

In addition, the composite signal obtained from the video detector 13 also is supplied to a color band-pass filter 30, which has a band-pass characteristic for selectively passing only the chrominance components of the detected composite signal, the chrominance components comprising the modulated color subcarrier and its side bands and the burst signal component. The output of the filter 30 then is applied to a bonding pad 31 of a chrominance or color processing circuit 32. The color processing circuit 32 preferably is fabricated on a single chip as an independent integrated circuit or as part of a larger integrated circuit and is shown in the drawing as enclosed in the dotted lines.

The circuit 32 includes a chroma/burst separator gate, and the modulated subcarrier output signals are obtained from an output bonding pad 34 and are applied to the primary winding of a transformer 35, the secondary winding of which is coupled to the color demodulator 18 to supply the modulated subcarrier signal thereto. In addition, the burst components are obtained from an output terminal 37 and are used to phase lock or synchronize a color reference oscillator 38, the output of which is supplied to a phase shift circuit 39 to produce the three phases of color reference signals to the color demodulator circuit 18 for demodulating the red, blue and green color signal components applied to the cathodes of the three electron guns of the three beam cathode-ray tube 24. The synchronous color demodulator 18 directly produces the three color signals needed to drive the cathodes of the cathode-ray tube 24.

The output signal level of the reference oscillator 38 is proportional to the amplitude of the burst signal components provided on the terminal 37; and this output signal level also is supplied to an automatic chroma control (ACC) amplifier circuit 40, which develops a DC control voltage or potential proportional to the amplitude of the burst signal component obtained from the terminal 37 of the processing circuit 32. This DC control voltage then is applied to a terminal 41 of the circuit 32, and is used within the circuit 32 to control the gain of the chrominance amplifiers therein.

In accordance with the preferred embodiment of the invention shown in the drawing, the color-processing circuit 32 is a single integrated circuit formed on an independent chip or as part of a larger chip including other portions of the color processing circuitry of the television receiver, such as the reference oscillator 34, the ACC amplifier 40, and a hue control circuit, if desired. In using an integrated circuit configuration, it is desirable to employ direct coupled DC paths between the different amplifier elements or stages in order to conserve space on the chip by eliminating coupling capacitors formed on the chip or to prevent the necessity of an excess number of bonding pads required when such coupling capacitors must be located outside of the integrated circuit chip. In addition, it is desirable to utilize differential circuit configurations whenever possible.

Referring now to the color processing circuit 32 in detail, a positive DC operating potential for the circuit is applied to the integrated circuit chip on a bonding pad 43 and through a resistor 44 to a string of series-connected transistor diodes 45 for establishing the various stabilized DC operating potentials utilized in the remainder of the integrated circuit 32. The transistors in the string 45 each have the bases and collectors thereof coupled together to form the string of diodes. The last transistor of the string 45 is coupled to ground through an output bonding pad 46. A DC operating potential for an NPN-input transistor 47 of the circuit 32 is obtained from the biasing string 45 through a resistor 48. The junction between the resistor 48 and the base of the transistor 47 is coupled to the bonding pad 31 to receive the composite signal from the output of the chroma band-pass filter 30.

The collector of the transistor 47 is coupled to the emitters of a pair of transistors 50 and 51, comprising a differential current modulator for controlling the gain of the chroma signals at the output of the transistor 47. The base of the transistor 50 is coupled to another biasing point on the bias string 45 to provide the transistor 50 with a DC reference level for the differential current modulator 50, 51. The base of the transistor 51 then is supplied with the ACC-DC control potential present on the terminal 41, so that variations in the level of the DC signal applied to the base of the transistor 51 cause corresponding variations in or modulation of the relative conductivity of the transistors 50 and 51, to thereby steer different amount of the amplified signal present on the collector 47 through the transistors 50 and 51. Whenever the transistor 51 is rendered increasingly conductive, due to an increasing ACC control potential, the transistor 50 is rendered decreasingly conductive and vice versa. As the conductivity of the transistor 50 decreases, the gain of the amplified signal present on the collector of the transistor 50 is decreased accordingly. It should be noted that an emitter-follower transistor 52 is coupled to the junction between the resistor 44 and the diode string 45 to supply operating potential to the transistor 50 through a collector-resistor 54 and to supply operating potential directly to the collector of the transistor 51.

The amplified gain-controlled chrominance signals obtained from the collector of the transistor 50 are applied to the base of an emitter-follower NPN-transistor 58, which then is utilized to drive an NPN-chroma signal output transistor 59. In order to cause the output signals obtained from the collector of the transistor 59 to have a DC operating point which is immune to the changes in DC level caused by the varying ACC signal applied to the base of the transistor 51, a constant current source for the emitter of the transistor 59 is provided by a transistor 61, having its collector connected to the emitter of the transistor 59 and its emitter coupled through a resistor 60 to the ground bonding pad 46. A stable DC biasing voltage level for the base of the transistor 61 is obtained from the diode string 45 and the transistor 61 is bypassed for AC signals through a capacitor 67 coupled between an output bonding pad 64 and ground. By utilizing the constant current source 61, the operating current of the transistor 59 is caused to be independent of the DC signal path from the differential amplifier 50, 51, with the result that the DC operating current level of the collector of the transistor 59 is constant, even though the gain of the AC signals applied to the base of the transistor 59 varies in accordance with the ACC control potential applied to the bonding pad 41 of the circuit 32.

In order to separate the subcarrier components from the burst components of the composite signal which is present on the collector of the transistor 59, these signals are applied to a chroma/burst gate in the form of a differential current steering gate including a pair of NPN-transistors 62 and 63, the emitters of which are coupled in common to the collector of the amplifier transistor 59. In the circuit shown in the drawing, the transistor 62 comprises the chroma output and the collector of this transistor is coupled to the emitters of an additional pair of NPN-transistors 65 and 66, constituting the output chroma amplifier for the color-processing circuit 32, with the collector of the transistor 66 being connected to the output terminal 34 of the circuit 32. The transistor 63 functions as the burst gate transistor for the circuit, and the collector of this transistor is coupled to the terminal 37 to provide the burst components to the reference oscillator 38.

In order to control the switching of the transistors 62 and 63 in the gate circuit, a further differential current steering gate, including a pair of NPN-transistors 68 and 69, is provided, with the operating potential for the transistors 68 and 69 being obtained through collector resistors from the emitter-follower 52. A constant current source in the form of an NPN-transistor 70 is provided for the differential current steering gate 68, 69, with the collector of the transistor 70 being coupled to the emitters of the transistors 68 and 69, and with the emitter of the transistor 70 being coupled through a resistor 72 to ground. Conduction of the transistor 70 is controlled by a stabilized DC bias potential obtained from the diode string 45.

Under normal conditions of operation during the horizontal scan portion of the cycle of operation, the reference bias potential applied to the base of the transistor 69 from the diode string 45 is sufficient to bias the transistor 69 into conduction, thereby causing a relatively low biasing potential to be applied to the base of the transistor 63, rendering the transistor 63 nonconductive. At the same time, the transistor 68 is nonconductive; so that the potential on its collector is high or positive, forward biasing the transistor 62 into conduction; so that the signals appearing on the collector of the transistor 59 are steered through the transistor 62 to the output differential amplifier 65, 66.

In order to control the gain of the chroma amplifier 65, 66, such as is effected by the color intensity control on a color television receiver, the relative conductivity of the transistors 65 and 66 is controlled through emitter-followers 75 and 76, respectively. The emitter-follower 76 is provided with a constant reference biasing potential from a voltage divider including a pair of resistors 77 and 78 connected between the bonding pads 43 and 46. A variable control, in the form of a potentiometer resistor 80, is provided external to the chip 31, with a tap on the resistor 80 establishing varying DC levels coupled to the base of the emitter-follower transistor 75 through a series resistor 81 and to the base of the transistor 76 through an additional coupling resistor 82. The cross-coupling provided by the resistor 81 and 82 causes the adjustment of the circuit to be substantially independent of changes in impedance of the potentiometer 80 caused by variations in ambient temperature and, in addition, reduces the effects of supply voltage variations. The relative DC levels on the bases of the transistor 75 and 76 also are established on the bases of the transistors 65 and 66.

Thus, the relative conductivity of the transistors 65 and 66 is varied in accordance with the setting of the tap on the resistor 80; so that more or less amounts of the chroma signal present on the collector of the transistor 62 are applied through the transistor 66 to the output bonding pad 34, thereby effecting chroma or color intensity control of the chroma signals.

During the retrace portion of each cycle of operation of the television system, a horizontal retrace pulse in the form of a positive pulse 90 is applied from the output of the horizontal sweep system 25 through a bonding pad 91 to the base of the transistor 68 in the differential steering gate 68, 69. This pulse 90 is of sufficient magnitude to drive the transistor 68 conductive, while at the same time the transistor 69 becomes nonconductive to reverse the relative potentials applied to the bases of the transistors 62 and 63; so that the transistor 62 is rendered nonconductive for the duration of the pulse 90 and the transistor 63 is rendered conductive. The timing of the pulse 90 is such that it occurs during the burst interval of the composite signal; so that when the burst signals present on the collector of the transistor 59 are steered through the transistor 63 to the output terminal 37 to control the operation of the reference oscillator 38. During this time interval, the transistor 62 is nonconductive; so that no chroma output is applied to the bonding pad 34. Upon termination of the pulse 90, the transistor 68 once again is rendered nonconductive and the transistor 69 conducts; so that the transistors 62 and 63 also are rendered conductive and nonconductive, respectively, to steer the output of the transistor 59 to the differential amplifier 65, 66.

In order to prevent undesirable transients from appearing in the outputs applied to the bonding pad 34 and terminal 37 of the processing circuit 32 due to the switching of the transistors 62 and 63 to effect gating of the chroma and burst signal components, an additional differential current steering gate, consisting of a pair of NPN-transistors 93 and 94, is provided, with the transistors 93 and 94 being comparable to the transistors 62 and 63 but being operated in the opposite phases. A constant current source for the transistor differential current steering gate 93, 94 is provided by an NPN-transistor 95, the collector of which is connected to the emitters of the transistors 93 and 94, and the emitter of which is coupled through a resistor 96 to the ground bonding pad 46. The base of the transistor 95 is coupled to the diode biasing string in common with the bases of the transistors 70 and 61.

Because the transistors 95 and 61 are provided with the same DC biasing potentials and the resistors 60 and 96 are of the same value, the DC operating current levels for the differential current steering gates 62, 63 and 93, 94 are the same. The collectors of the transistors 62 and 93 are coupled in common to the input of the differential amplifier 65, 66 with the collectors of the transistors 63 and 94 being connected in common to the terminal 37. The bases of the transistors 62 and 93, however, are connected to different outputs of the differential steering gate 68, 69, as are the bases of the transistors 63, and 94.

As a consequence, when the transistor 62 is rendered nonconductive, the transistor 93 is conductive; and when the transistor 63 is rendered nonconductive, the transistor 94 is conductive. As a result, when the transistor 62 conducts to apply the modulated subcarrier signal components to the differential amplifier 65, 66, the transistor 94 is conductive to apply a DC level to the output terminal 37, with this DC level being the same as the DC level of the signal components. On the other hand, whenever the transistor 63 is rendered conductive, with the transistor 62 being nonconductive, to gate the output of the amplifier 59 to the terminal 37, the transistor 93 likewise is rendered conductive to apply the DC operating level to the differential amplifier transistors 65, 66. This substitution of the DC operating level maintains the DC signal component on the terminal 37 and on the emitters of the transistors 65, 66 constant throughout the switching operation of the differential current steering gate 62, 63, thereby providing transientless switching of the chroma and burst components to the respective output circuits.

Since the output of the ACC amplifier 40 applied to the terminal 41 is responsive to the amplitude of the burst components and is more positive or increases with an increasing amplitude of the burst component, it is apparent that in the absence of any burst components in the signal, due to the lack of transmission of a color signal, or due to a weak signal being received, the output of the ACC amplifier 40 is at a low or minimum level. This may be utilized to operate a color killer circuit to disable the chroma amplifier, so that no spurious signals are applied to the output bonding pad 34 during periods of no color transmission or of very weak color transmission. To accomplish this, the signals present on the terminal 41 are applied through a coupling resistor 100 to the base of a color killer input NPN-transistor 101, the emitter of which is connected through a resistor 102 to ground. The resistor 102 is utilized to establish the threshold level for operation of the color killer circuit in a well-known manner.

Operating potential for the color killer amplifier 101 is obtained from the emitter of an emitter-follower transistor 103, the base of which is supplied with a stabilized reference potential from the diode string 45.

In the presence of burst signal components above the threshold level, the transistor 101 is rendered conductive to apply a relatively low potential to the base of an NPN-transistor 104, rendering the transistor 104 nonconductive. Since the emitter of the transistor 104 is coupled to the base of a further NPN-amplifier transistor 105 the transistor 105 likewise is rendered nonconductive, so that the color killer circuit has no affect on the operation of the remainder of the color processing circuit 32, which functions in the manner described previously. When the potential on the bonding pad 41, however, drops to a point sufficiently low to render the transistor 101 nonconductive, the transistor 104 conducts to apply a positive potential to the base of the transistor 105, which in turn conducts, thereby substantially reducing the potential on its collector.

This potential is applied to the base of the transistor 76; and causes the transistor 76 to be rendered nonconductive, which in turn renders the transistor 66 nonconductive; so that no output signals are obtained on the bonding pad 34, irrespective of the switching action of the transistors 68 and 69. The transistors 68 and 69, however, continue to operate in the manner described previously to gate the transistor 63 on during the time interval in which the burst signal components should appear. Thus, as soon as a burst signal component of sufficient magnitude does appear in the input signal received by the receiver, the reference oscillator 38 responds with an increased signal level. This increase is reflected in the output of the ACC amplifier 40 which then disables the color killer circuit, with operation resuming and continuing in the manner described previously.

We claim:

1. In a color television receiver for utilizing composite signals comprising at least a subcarrier component, modulated in phase and amplitude to represent hue and saturation of the color image, and a color reference burst signal component, a signal-processing circuit including in combination:

first differential current gate means having an input and first and second outputs;

second differential current gate means having an input and first and second outputs;

means for coupling together the first outputs of the first and second differential current gates;

means for coupling together the second outputs of the first and second differential current gates;

input amplifier means for supplying at least the subcarrier component and the burst signal component to the input of the first differential current gate means;

means for establishing a DC operating current for the input amplifier means, the operating current being substantially independent of the DC level of the signal present on the input of the input amplifier means;

means for supplying a DC signal having a current level bearing a predetermined relationship with said DC operating current to the input of the second differential current gate means;

switch means having at least two states of operation coupled to the first and second differential current gate means for controlling the operation of the first and second differential current gate means to cause the first output of the first differential current gate means and the second output of the second differential current gate means to appear when the switch means is in one state of operation, and causing the second output of the first differential current gate means and the first output of the second differential current gate means to appear with the switch means in a second state of operation; and control means for controlling the state of operation of the switch means.

2. The combination according to claim 1 wherein the means for supplying said DC signal to the input of the second differential current gate means includes a constant current source; and wherein the means for establishing the DC operating current for the input amplifier means includes a second constant current source, with means for causing the second constant current source to appear as an AC ground.

3. In a color television receiver for utilizing composite signals comprising at least a subcarrier component, modulated in phase and amplitude to represent hue and saturation of the color image, and a color reference burst signal component, a signal processing circuit including in combination:

first differential current gate means having an input and first and second outputs;

second differential current gate means having an input and first and second outputs;

means for coupling together the first outputs of the first and second differential current gate means;

means for coupling together the second outputs of the first and second differential current gate means;

means for supplying at least the subcarrier component and the burst signal component at a predetermined DC current level to the input of the first differential current gate means;

means for supplying a DC current at a level which is substantially the same as said predetermined DC current level to the input of the second differential current gate means;

switch means having at least two states of operation coupled to the first and second differential current gate means for controlling the operation of the first and second differential current gate means to cause the first output of the first differential current gate means and the second output of the second differential current gate means to appear with the switch means in one state of operation and causing the second output of the first differential current gate means and the first output of the second differential current gate means to appear with the switch means in a second state of operation; and control means for controlling the state of operation of the switch means.

4. The combination according to claim 3 wherein the composite signals also include synchronizing components and wherein the control means includes means responsive to said synchronizing components to cause the switch means to be in said one state of operation when said subcarrier component is present and to be in said second state of operation when said burst component is present in said composite signal.

5. The combination according to claim 4 wherein the first and second differential current gate means each include first and second transistors, the transistors each having first, second and control electrodes, with the second electrodes of the first and second transistors of the first current gate means being coupled together as the input of the first differential current gate means, the second electrodes of the first and second transistors of the second differential current gate means being coupled together as the input of the second differential current gate means, the switch means being coupled to the control electrodes and rendering the first transistor of the first differential current gate means and the second transistor of the second differential current gate means conductive in said one state of operation and rendering the second transistor of the first differential current gate means and the first transistor of the second differential current gate means conductive in said second state of operation with the first electrodes of the first transistors in each of the differential current gate means comprising said first outputs and with the first electrodes of the second transistors in each of the differential current gate means comprising said second outputs.

6. The combination according to claim 5 wherein the second electrodes are emitter electrodes, the first electrodes are collector electrodes, and the control electrodes are base electrodes of the first and second transistors of the first and second differential current gate means, with the second transistor of the first differential current gate means and the first transistor of the second differential current gate means being nonconductive with the switch means in said one state of operation and with the first transistor of the first differential current gate means being nonconductive with the switch means in said second state of operation.

7. The combination according to claim 5 wherein the means for supplying the DC current to the transistors of the second differential current gate means includes a constant current source.

8. The combination according to claim 5 wherein the switch means includes a third differential current gate means having first and second switching transistors therein, each having first, second, and control electrodes, with the control electrodes of the first switching transistor being coupled to a point of reference potential, and wherein the control means includes means for applying switching pulses to the control electrode of the second switching transistor when said burst component is present in the composite signal, the first electrode of the first switching transistor being coupled to the control electrodes of the first transistor of the first differential current gate means and the second transistor of the second differential current gate means, and the first electrode of the second switching transistor being coupled to the control electrodes of the second transistor of the first differential current gate means and the first transistor of the second differential current gate means.

9. The combination according to claim 8 wherein the second switching transistor of the third differential current gate means is normally conductive and the first switching transistor is normally nonconductive for said one state of operation of the switch means, said switching pulses rendering the first switching transistor conductive and the second switching transistor nonconductive for said second state of operation of the switch means.

10. In a color television receiver for utilizing composite signals comprising at least a subcarrier component, modulated in phase and amplitude to represent hue and saturation of a color image, and a color reference burst signal component, said receiver including means responsive to the burst signal component to develop a DC control voltage varying in amplitude with amplitude variations of the burst signal component, an amplifier circuit including in combination:

differential current modulator means including first and second amplifier devices each having first, second and control electrodes, the first electrodes each connected with a source of operating potential;

means for connecting a reference bias potential to the control electrode of one of the amplifier devices;

means for applying the DC control voltage to the control electrode of the other of the amplifier devices to vary the relative conductivities of the first and second amplifier devices with respect to one another;

means for applying said composite input signal to the differential current modulator means;

output amplifier means having an input;

means for DC coupling the first electrode of the first amplifier device to the input of the output amplifier means; and means for establishing a constant DC operating current for the output amplifier means, the operating current being independent of the DC level of the signal present on the first electrode of the first amplifying device.

11. The combination according to claim 10 wherein the first and second amplifier devices are first and second transistors having collector, emitter and base electrodes corresponding to the first, second, and control electrodes, respectively, and wherein the DC control voltage varies the amount of signal current which is passed through the collector-emitter path of the first transistor.

12. The combination according to claim 11 wherein the output amplifier means includes a third transistor having collector, emitter and base electrodes, with the output signals appearing on the collector electrode of the first transistor being coupled with the base electrode of the third transistor, and with the emitter of the third transistor being coupled to a constant current source comprising said means for establishing said independent DC operating current for the output amplifier transistor.

13. The combination according to claim 12 wherein the constant current source is an additional transistor having base, collector, and emitter electrodes, with means for coupling the base electrode to a stabilized biasing potential and with the collector-emitter path of said additional transistor being connected in circuit between the emitter of the third transistor and a point of reference potential, said combination further including alternating current bypass means coupled between the emitter of the third transistor and the point of reference potential.

* * * * *